United States Patent
Muraoka et al.

(10) Patent No.: US 12,473,713 B2
(45) Date of Patent: Nov. 18, 2025

(54) ELECTRIC WORK MACHINE

(71) Applicant: Yanmar Holdings Co., Ltd., Osaka (JP)

(72) Inventors: Hiroyuki Muraoka, Fukuoka (JP); Mitsuyuki Hatanaka, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 0 days.

(21) Appl. No.: 18/657,813

(22) Filed: May 8, 2024

(65) Prior Publication Data

US 2024/0410132 A1  Dec. 12, 2024

(30) Foreign Application Priority Data

Jun. 7, 2023 (JP) ................. 2023-093813

(51) Int. Cl.
*E02F 3/32* (2006.01)
*B60K 1/04* (2019.01)
*E02F 9/08* (2006.01)
*B60K 1/00* (2006.01)

(52) U.S. Cl.
CPC .............. *E02F 9/0866* (2013.01); *B60K 1/04* (2013.01); *E02F 3/325* (2013.01); *E02F 9/0883* (2013.01); *B60K 2001/005* (2013.01); *B60K 2001/0405* (2013.01); *B60L 2200/40* (2013.01);
(Continued)

(58) Field of Classification Search
CPC ....... E02F 9/0866; E02F 9/0883; E02F 9/207; E02F 9/0858; E02F 9/2264; E02F 9/08; E02F 9/22; E02F 9/00; E02F 9/20; E02F 3/325; E02F 3/32; B60L 2200/40; B60K 1/04; B60K 2001/0405; B60K 2001/003; B60K 2001/005; B60K 11/00; B60K 11/06; B60K 11/08; B60Y 2200/41;
(Continued)

(56) References Cited

U.S. PATENT DOCUMENTS 6,678,972 B2 * 1/2004 Naruse ...................... E02F 9/16
                                                    903/903
8,037,963 B2 * 10/2011 Nishimura ............ E02F 9/2292
                                                    180/291
(Continued)

FOREIGN PATENT DOCUMENTS

EP  1091048 A2 *  4/2001  ............. E02F 3/325
EP  3705631 A1 *  9/2020  ............. E02F 9/0866
(Continued)

Primary Examiner — Keith J Frisby
(74) Attorney, Agent, or Firm — Chris Mizumoto

(57) ABSTRACT

A hydraulic excavator as an electric work machine includes, in a machine body, a battery unit that stores electric power, an electric motor that is driven by the electric power supplied from the battery unit, a hydraulic pump that is driven by the electric motor, an oil cooler that cools hydraulic oil discharged from the hydraulic pump, and a fan that draws air into the machine body. The machine body has a first opening and a second opening, and the first opening is provided on a first lateral side of the machine body, and the second opening is provided on a second lateral side of the machine body. The fan is placed to face the first opening in the machine body, and the oil cooler is placed to face the second opening in the machine body.

16 Claims, 11 Drawing Sheets

(52) U.S. Cl.
CPC ..... *B60Y 2200/412* (2013.01); *B60Y 2200/91* (2013.01); *B60Y 2400/89* (2013.01)

(58) Field of Classification Search
CPC ........ B60Y 2200/412; B60Y 2200/415; B60Y 2200/91; B60Y 2400/89
USPC ................................................ 180/53.4, 68.1
See application file for complete search history.

(56) References Cited

U.S. PATENT DOCUMENTS

| | | | | |
|---|---|---|---|---|
| 8,540,042 | B2 * | 9/2013 | Atarashi | ................ B60L 58/26 |
| | | | | 180/68.5 |
| 2022/0145587 | A1 * | 5/2022 | Takeo | .................... B60K 25/00 |
| 2023/0167623 | A1 * | 6/2023 | Kitahara | ................. E02F 9/207 |
| | | | | 60/325 |
| 2023/0295896 | A1 * | 9/2023 | Takaki | .................... E02F 9/163 |
| | | | | 296/190.01 |
| 2023/0417015 | A1 * | 12/2023 | Kitahara | ............... E02F 9/0866 |

FOREIGN PATENT DOCUMENTS

| | | | | | |
|---|---|---|---|---|---|
| JP | | 2011021431 | A | * | 2/2011 |
| WO | WO-2008015798 | A1 | * | 2/2008 | ............ E02F 9/0866 |
| WO | WO-2023188979 | A1 | * | 10/2023 | |
| WO | WO-2024085517 | A1 | * | 4/2024 | |
| WO | WO-2024154522 | A1 | * | 7/2024 | |

\* cited by examiner

ELECTRIC WORK MACHINE

CROSS-REFERENCE

This application claims foreign priority of JP2023-093813 filed Jun. 7, 2023, the disclosure of which is hereby incorporated by reference in its entirety.

TECHNICAL FIELD

The present invention relates to an electric work machine.

BACKGROUND ART

An electric construction machine including a battery unit in a machine body is known as a conventional technique (see, for example, Patent Document 1).

PRIOR ART DOCUMENT

Patent Document
  Patent Document 1: Japanese Unexamined Patent Application Publication No. 2022-97079

SUMMARY OF INVENTION

Technical Problem

A small-sized electric work machine preferably includes a large battery unit in the limited space in a machine body, achieving a higher battery capacity and a longer operating time. At the same time, such an electric work machine preferably efficiently cools devices (including the battery unit) in the machine body. In an electric construction machine of Patent Document 1, securing a large space for placing a battery unit is considered, but efficiently cooling devices in a machine body is not considered. In the electric construction machine of Patent Document 1, there is room for improvement in this regard.

The present invention has been made to solve the above problem, and an object of the present invention is to provide an electric work machine including a battery unit as large as possible in the limited space in a machine body while efficiently cooling a device in the machine body, achieving a higher battery capacity.

Solution to Problem

An electric work machine according to an aspect of the present invention includes: in a machine body, a battery unit that stores electric power; an electric motor that is driven by the electric power supplied from the battery unit; a hydraulic pump that is driven by the electric motor; an oil cooler that cools hydraulic oil discharged from the hydraulic pump; and a fan that draws air into the machine body, wherein the machine body has a first opening and a second opening, the first opening is provided on a first lateral side of the machine body, the second opening is provided on a second lateral side of the machine body, the fan is placed to face the first opening in the machine body, and the oil cooler is placed to face the second opening in the machine body.

Advantageous Effects of Invention

The above configuration makes it possible to provide a battery unit as large as possible in the limited space in a machine body while efficiently cooling a device in the machine body, achieving a higher battery capacity.

DESCRIPTION OF EMBODIMENTS

An embodiment of the present invention will be described below with reference to the drawings.

1. Electric Work Machine

Figure 1:
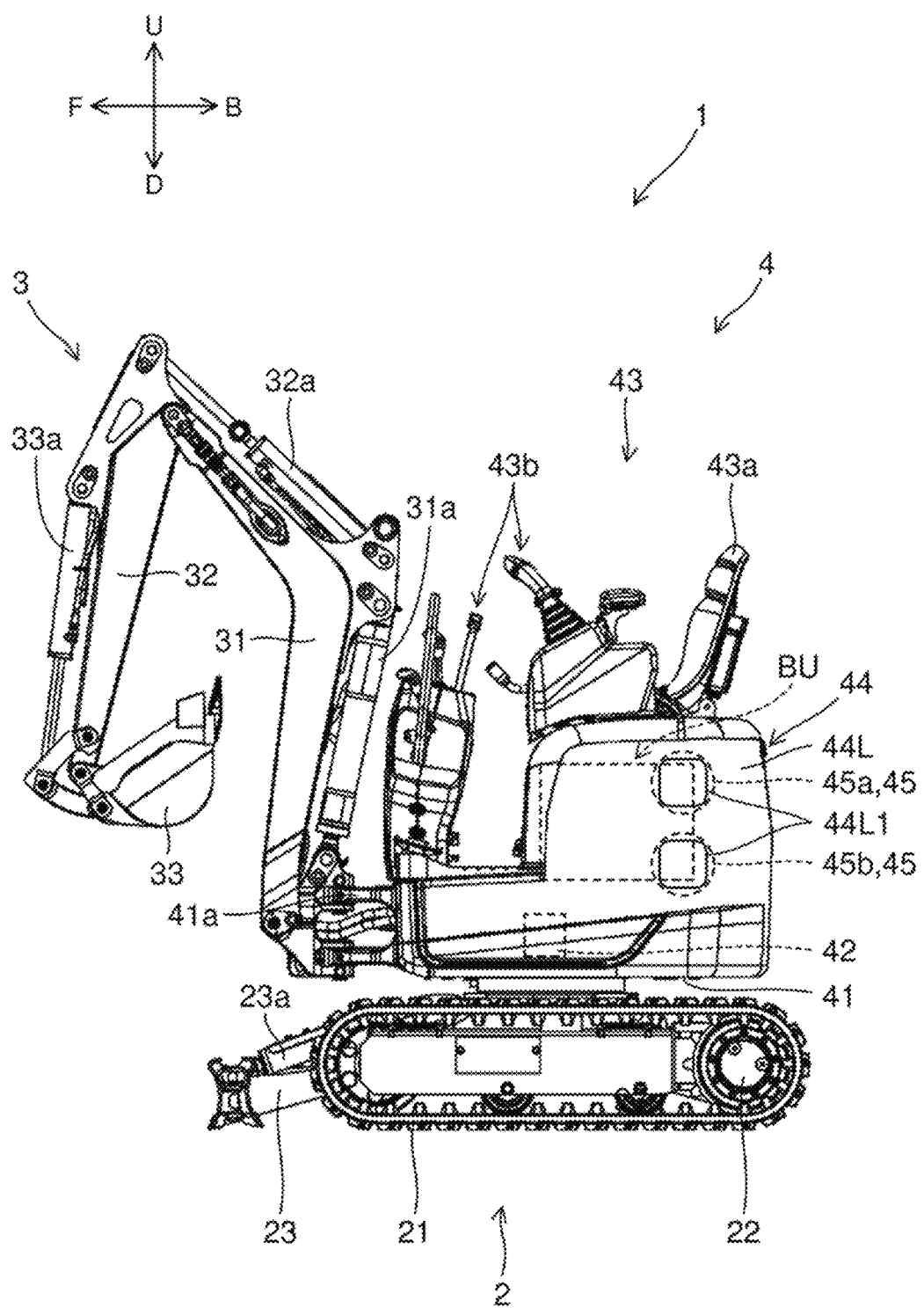
FIG. 1 is a left side view of a schematic configuration of a hydraulic excavator as an example of an electric work machine according to an embodiment of the present invention.
Figure 2:
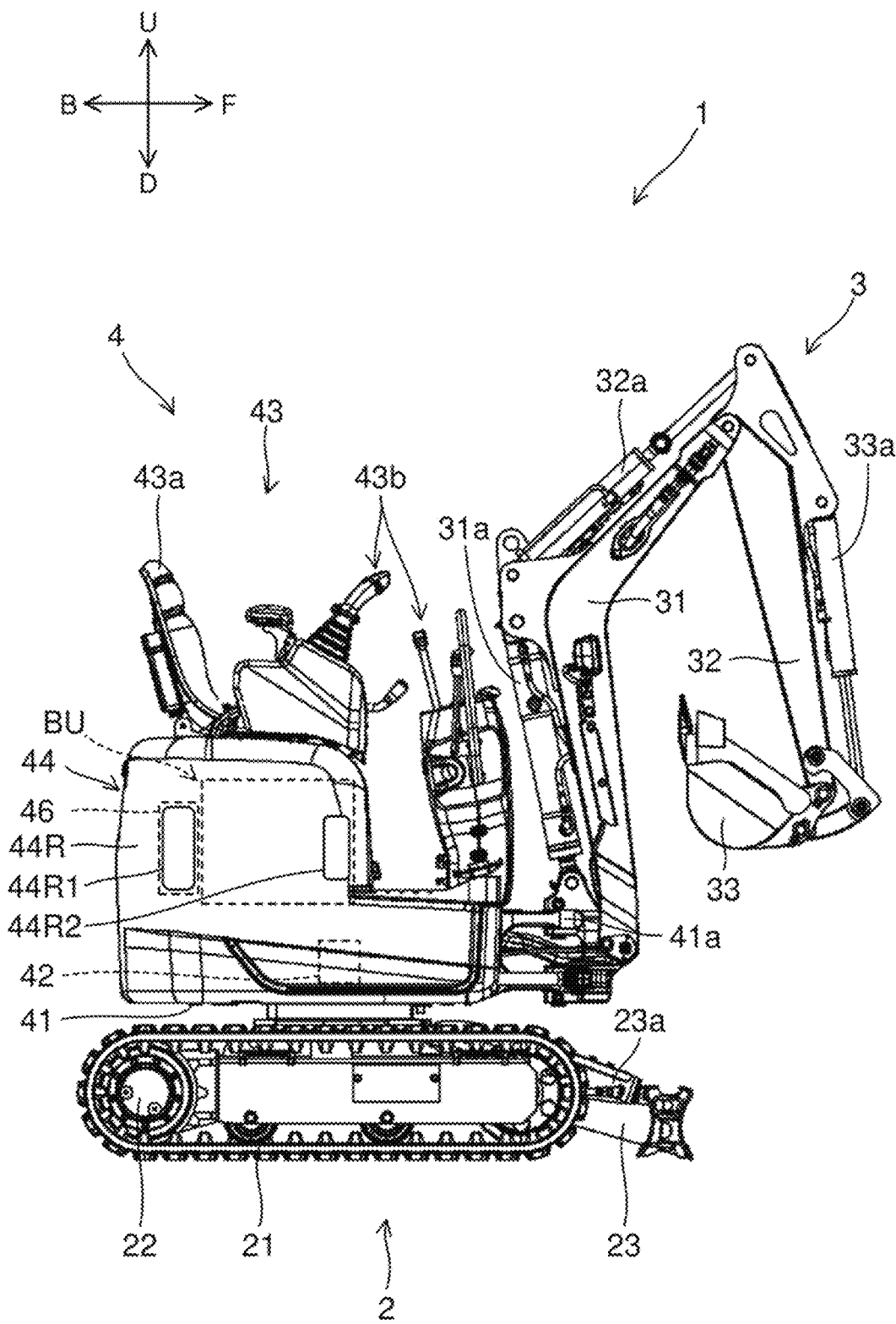
FIG. 2 is a right side view of the hydraulic excavator.

FIG. 1 is a left side view of a schematic configuration of a hydraulic excavator 1 (electric excavator) as an example of an electric work machine according to an embodiment of the present invention. FIG. 2 is a right side view of the hydraulic excavator 1. The hydraulic excavator 1 includes a lower traveling body 2, a work machine 3, and an upper turning body 4 (also referred to as a machine body). In the present embodiment, an internal configuration of the upper turning body 4 (in particular, an engine room 44 described below) will be described based on two examples (first arrangement example, second arrangement example). The following will describe a case in which the first arrangement example is applied to the internal configuration of the upper turning body 4 (engine room 44).

Here, directions are defined as follows. A "front" direction refers to the direction an operator (manipulator, driver) is facing when the operator is sitting in a driver's seat 43a placed in a manipulation unit 43 of the upper turning body 4 and is looking straight ahead, and a "back" direction refers to the direction opposite to the front direction. The front-back direction of the upper turning body 4 matches the front-back direction of the lower traveling body 2 while the upper turning body 4 is not turned (turning angle: 0 degrees) with respect to the lower traveling body 2. The drawings illustrate the hydraulic excavator 1 while the upper turning body 4 is not turned with respect to the lower traveling body 2. Furthermore, "left" refers to the left side as viewed from an operator sitting in the driver's seat 43a, and "right" refers to the right side as viewed from the operator sitting in the driver's seat 43a. Furthermore, an up-down direction refers to the gravity direction perpendicular to the front-back direction and the left-right direction, and "up" refers to the upstream side of the gravity direction, and "down" refers to the downstream side of the gravity direction. In the drawings, when necessary, the symbol "F" represents forward, "B" represents backward, "R" represents rightward, "L" represents leftward, "U" represents upward, and "D" represents downward.

The lower traveling body 2 includes a pair of left and right crawlers 21, a pair of left and right traveling motors 22, and a blade 23. The left and right traveling motors 22 drive the left and right crawlers 21, respectively, to enable the hydraulic excavator 1 to move forward and backward. The traveling motors 22 are composed of a hydraulic motor. The blade 23 that performs ground leveling work and the like is provided on the front side of the lower traveling body 2. The blade 23 is rotated by a blade cylinder 23a. The blade cylinder 23a is composed of a hydraulic cylinder.

The work machine 3 includes a boom 31, an arm 32, and a bucket 33. The boom 31, the arm 32, and the bucket 33 are independently driven to perform excavation work for excavating earth, sand, and the like.

The boom 31 is rotated by a boom cylinder 31a. The boom cylinder 31a has a base end portion supported by a front portion of the upper turning body 4, and is freely movable in an extendable and retractable manner. In the drawings, the boom cylinder 31a is placed so that the base end portion of the boom cylinder 31a is located on the rod side; however, the boom cylinder 31a may be placed so that the base end portion is located on the tube side. The arm 32 is rotated by an arm cylinder 32a. The arm cylinder 32a has a base end portion supported by the boom 31, and is freely movable in an extendable and retractable manner. The bucket 33 is rotated by a bucket cylinder 33a. The bucket cylinder 33a has a base end portion supported by the arm 32, and is freely movable in an extendable and retractable manner. The boom cylinder 31a, the arm cylinder 32a, and the bucket cylinder 33a are each composed of a hydraulic cylinder.

A base end portion of the boom 31 is swingably connected to a tip end portion 41a of a turning frame 41 (described below) via a bracket (not illustrated). That is, the hydraulic excavator 1 of the present embodiment has a boom swing function in which the boom 31 swings to the left and right from the tip end portion 41a.

The upper turning body 4 is located above the lower traveling body 2, and is provided to be turnable with respect to the lower traveling body 2 via a turning bearing (not illustrated). The upper turning body 4 includes the turning frame 41, a turning motor 42, the manipulation unit 43, and the engine room 44. The upper turning body 4 is turned with respect to the lower traveling body 2 by driving of the turning motor 42 placed on the turning frame 41. The turning frame 41 includes a plurality of metal members joined by welding or the like. The turning motor 42 is composed of a hydraulic motor.

The engine room 44 is provided with a left hood 44L as a left side wall and a right hood 44R as a right side wall. The left hood 44L is located on the left side (first lateral side) of the engine room 44, and the right hood 44R is located on the right side (second lateral side) of the engine room 44. Each of the left hood 44L and the right hood 44R is fixed to the turning frame 41 via a support member (not illustrated). First openings 44L1 of the left hood 44L and a second opening 44R1 and a third opening 44R2 of the right hood 44R will be described below.

Battery units BU and fans 45 are housed in the engine room 44. That is, the hydraulic excavator 1 includes the battery units BU and the fans 45 in the machine body. The battery units BU are composed of, for example, a lithium-ion battery, and store electric power for driving an electric motor EM (see FIG. 3). Each of the battery units BU may be composed of a plurality of batteries as a unit, or may be composed of a single battery cell. The upper turning body 4 is provided with a power supply port (not illustrated). The power supply port is connected to an external power source (not illustrated) to charge the battery units BU.

The fans 45 are composed of an electric fan, and draw air (outside air) into the engine room 44. That is, the fans 45 draw air into the machine body. This leads to generation of a wind flow in the engine room 44. The fans 45 include a first fan 45a and a second fan 45b. The first fan 45a is located above the second fan 45b. That is, the plurality of fans 45 are arranged in the up-down direction.

Hydraulic pumps 61 (see FIG. 3) and an oil cooler 46 are further housed in the engine room 44. That is, the hydraulic excavator 1 includes the hydraulic pumps 61 and the oil cooler 46 in the machine body. The hydraulic pumps 61 are driven by the electric motor EM, and supply hydraulic oil (pressure oil) to the hydraulic motors (e.g., the left and right traveling motors 22, the turning motor 42) and the hydraulic cylinders (e.g., the blade cylinder 23a, the boom cylinder 31a, the arm cylinder 32a, the bucket cylinder 33a). The hydraulic motors and the hydraulic cylinders that are driven by the hydraulic oil supplied from the hydraulic pumps 61 are collectively referred to as a hydraulic actuator 63 (see FIG. 3).

Figure 3:
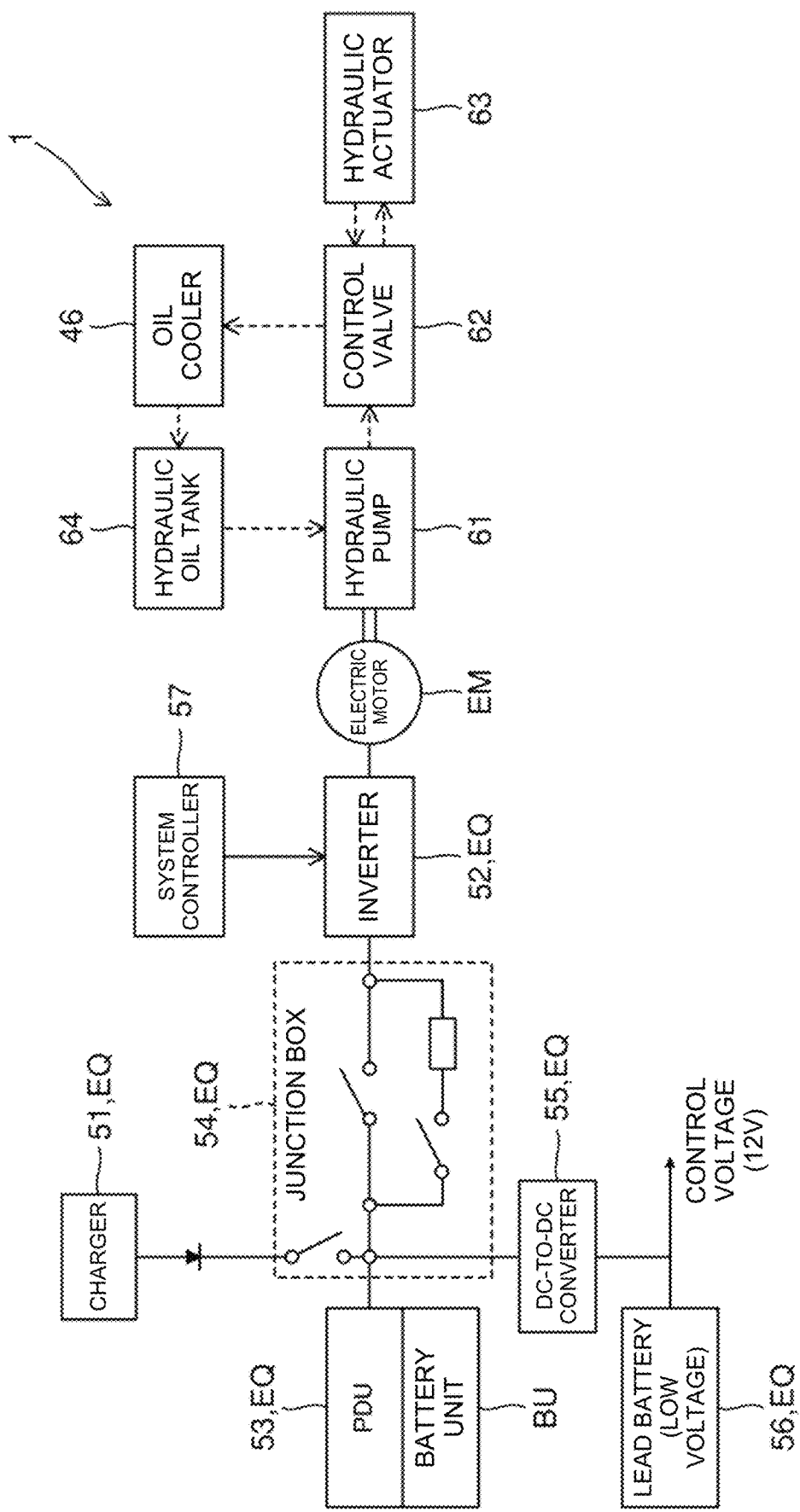
FIG. 3 is a block diagram schematically illustrating a configuration of an electrical system and a hydraulic system of the hydraulic excavator.

The oil cooler 46 is connected to an oil passage through which hydraulic oil discharged from the hydraulic pumps 61 circulates (see FIG. 3). In the oil passage, hydraulic oil heated due to driving of the hydraulic actuator 63 flows into the oil cooler 46 via a control valve 62. The oil cooler 46 is composed of a heat exchanger that cools hydraulic oil by exchanging heat with wind (air) hitting the oil cooler 46. That is, the oil cooler 46 cools the hydraulic oil that is discharged from the hydraulic pumps 61 and is heated by driving of the hydraulic actuator 63.

The manipulation unit 43 is provided in an upper portion of the upper turning body 4. The manipulation unit 43 includes the driver's seat 43a. A plurality of steering members 43b are placed around the driver's seat 43a. The plurality of steering members 43b include a lever, a switch, a pedal, and the like. An operator sits in the driver's seat 43a and operates the plurality of steering members 43b to drive the hydraulic actuator 63. This enables the hydraulic excavator 1 to perform traveling of the lower traveling body 2, ground leveling work using the blade 23, excavation work using the work machine 3, turning of the upper turning body 4, and the like.

The hydraulic excavator 1 may be configured to use, as actuators, both the hydraulic actuator 63 and an electric actuator driven by electric power. The electric actuator includes, for example, an electric traveling motor, an electric turning motor, and an electric cylinder.

2. Configuration of Electrical System and Hydraulic System

FIG. 3 is a block diagram schematically illustrating a configuration of an electrical system and a hydraulic system of the hydraulic excavator 1. In FIG. 3, a wire through which an electrical signal or a current flows is indicated by a solid line, and an oil passage through which hydraulic oil flows is indicated by a dashed line. The hydraulic excavator 1 includes the electric motor EM, a charger 51, an inverter 52, a power drive unit (PDU) 53, a junction box 54, DC-to-DC converters 55, a lead battery 56, and a system controller 57. The charger 51, the inverter 52, the PDU 53, the junction box 54, the DC-to-DC converters 55, and the lead battery 56 are collectively referred to as electrical equipment EQ. The electrical equipment EQ is housed in the engine room 44 (see FIG. 4).

Each piece of electrical equipment EQ is directly connected to the battery units BU, or is electrically connected to the battery units BU via another piece of electrical equipment. For example, the PDU 53 as a piece of electrical equipment EQ is directly connected to the battery units BU. Furthermore, the inverter 52 as a piece of electrical equipment EQ is electrically connected to the battery units BU via the junction box 54 as another piece of electrical equipment EQ.

The electric motor EM is driven by electric power supplied from the battery units BU via the junction box 54 and the inverter 52. The electric motor EM is composed of a synchronous motor, an induction motor, or the like. The electric motor EM is housed in the engine room 44. That is, the hydraulic excavator 1 includes, in the machine body, the electric motor EM that is driven by electric power supplied from the battery units BU.

The charger 51 (also referred to as a power feeder) converts an AC voltage supplied from the external power source into a DC voltage. The inverter 52 converts a DC voltage supplied from the battery units BU into an AC voltage, and supplies the AC voltage to the electric motor EM. Thus, the electric motor EM is driven. The supply of an AC voltage from the inverter 52 to the electric motor EM is performed based on a rotation command output from the system controller 57.

The PDU 53 is a battery control unit that controls an internal battery relay to control the input and output of the battery units BU. The junction box 54 includes a charger relay, an inverter relay, a fuse, and the like. A voltage output from the charger 51 is supplied to the battery units BU via the junction box 54 and the PDU 53. Furthermore, a voltage output from the battery units BU is supplied to the inverter 52 via the PDU 53 and the junction box 54.

The DC-to-DC converters 55 convert a high (e.g., 300 V) DC voltage supplied from the battery units BU via the junction box 54 to a low (e.g., 12 V) DC voltage. The lead battery 56 outputs a low DC voltage. A low DC voltage output from the DC-to-DC converters 55 and the lead battery 56 is supplied to a drive unit of the fans 45 (the first fan 45a and the second fan 45b), the system controller 57, and the like. In the present embodiment, the hydraulic excavator 1 includes the plurality of DC-to-DC converters 55 (see FIG. 4); however, the hydraulic excavator 1 may include a single DC-to-DC converter 55. The system controller 57 is composed of an electronic control unit also referred to as an ECU. The system controller 57 electrically controls components of the hydraulic excavator 1.

The plurality of hydraulic pumps 61 are connected to a rotating shaft (output shaft) of the electric motor EM. The plurality of hydraulic pumps 61 include a variable displacement pump and a fixed displacement pump. FIG. 3 illustrates only a single hydraulic pump 61 as an example. Each of the hydraulic pumps 61 is connected to a hydraulic oil tank 64 that stores hydraulic oil. When the hydraulic pumps 61 are driven by the electric motor EM, the hydraulic oil in the hydraulic oil tank 64 is supplied to the hydraulic actuator 63 via the control valve 62. Thus, the hydraulic actuator 63 is driven. That is, the hydraulic actuator 63 is driven by the hydraulic oil supplied by the hydraulic pumps 61. The control valve 62 is a direction switching valve that controls the flow direction and flow rate of the hydraulic oil supplied to the hydraulic actuator 63 by the hydraulic pumps 61.

Hydraulic oil discharged from the hydraulic actuator 63 flows into the hydraulic oil tank 64 via the control valve 62 and the oil cooler 46. Therefore, the hydraulic oil heated due to driving of the hydraulic actuator 63 is cooled by the oil cooler 46, and then flows into the hydraulic oil tank 64. Thus, the hydraulic excavator 1 includes the oil cooler 46, the control valve 62, the hydraulic actuator 63, and the hydraulic oil tank 64.

3. Internal Configuration of Engine Room

Figure 4:
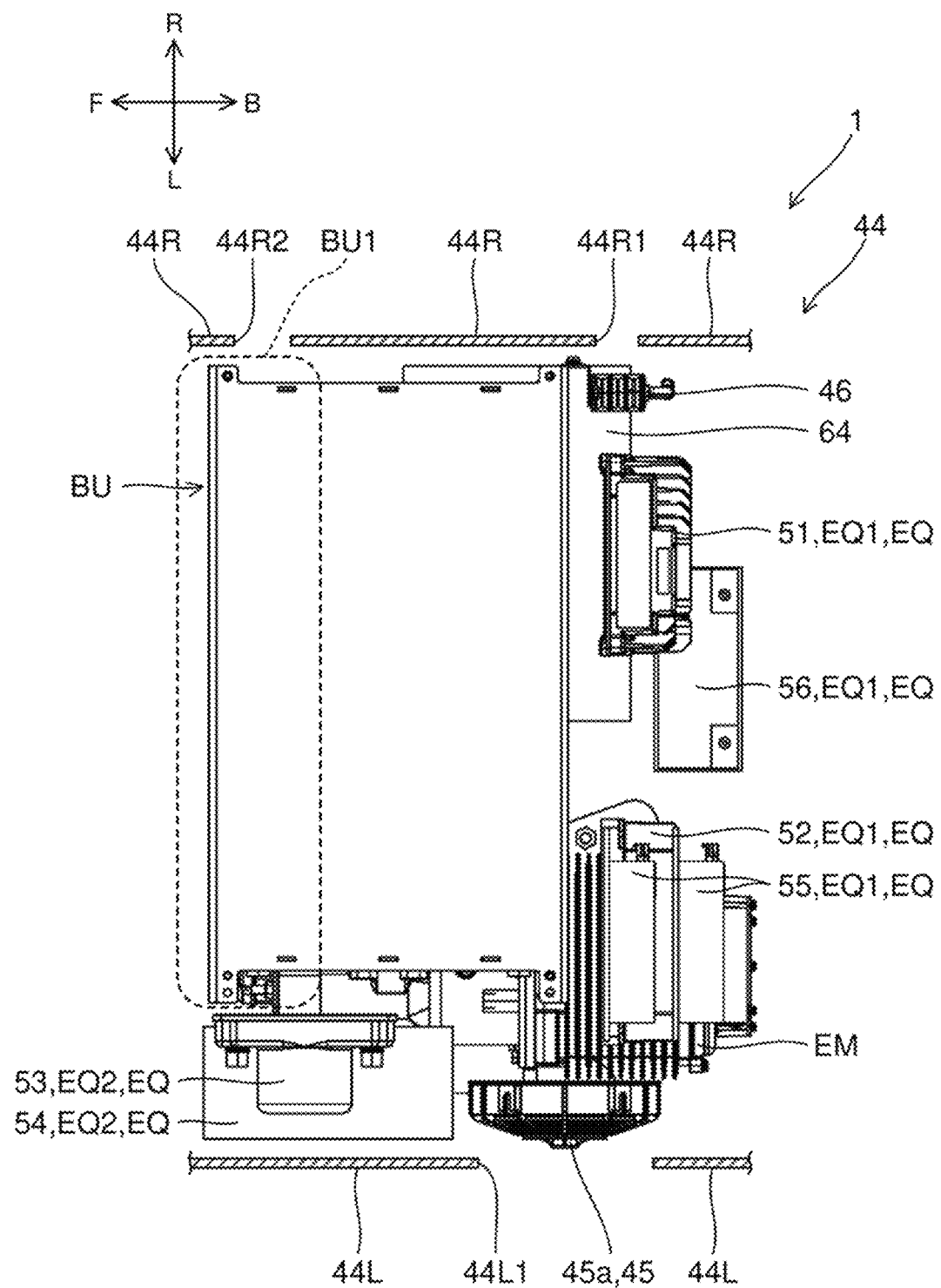
FIG. 4 is a plan view of an internal configuration in a first arrangement example of an engine room of the hydraulic excavator.
Figure 5:
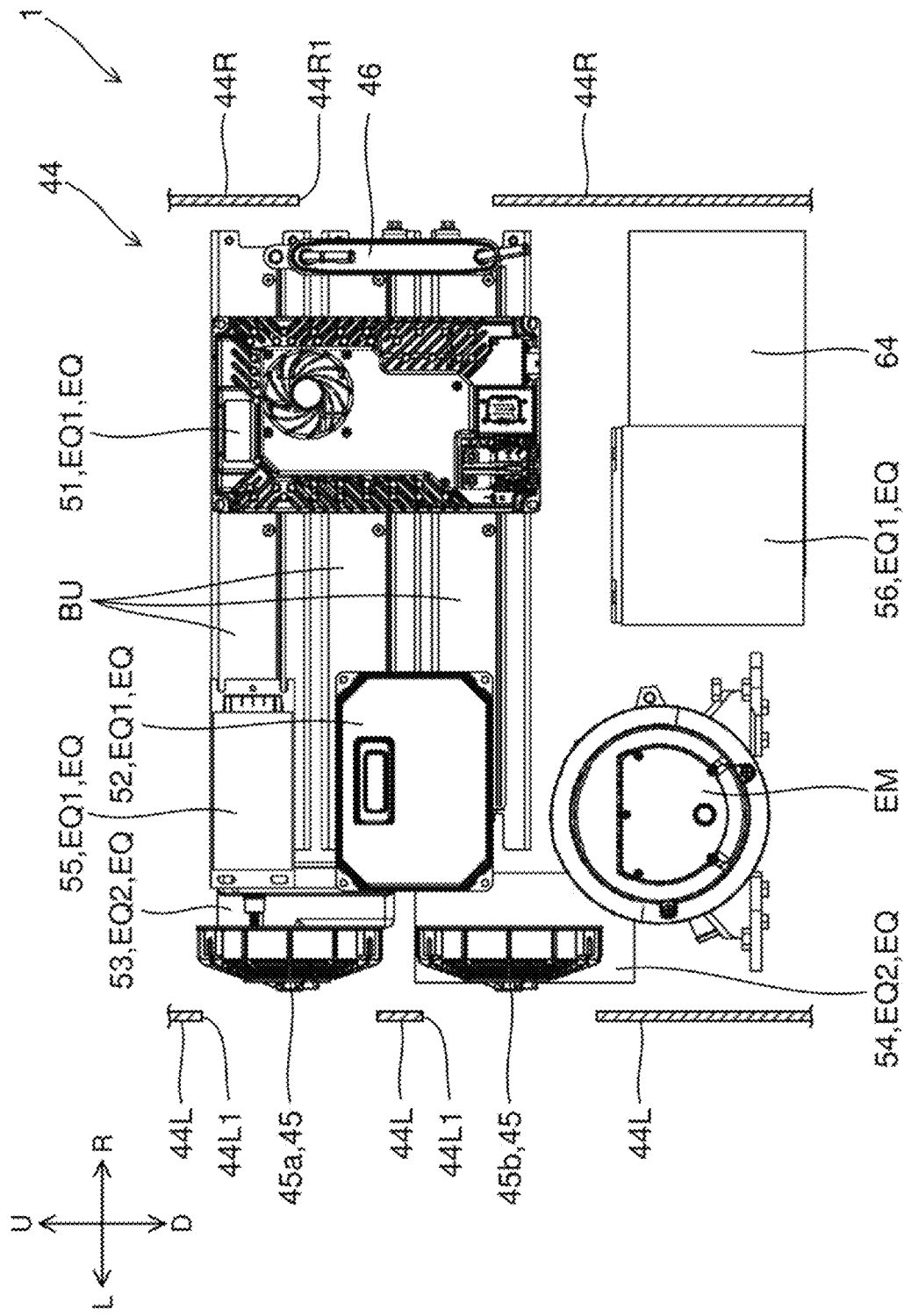
FIG. 5 is a back view of the internal configuration in the first arrangement example of the engine room.
Figure 6:
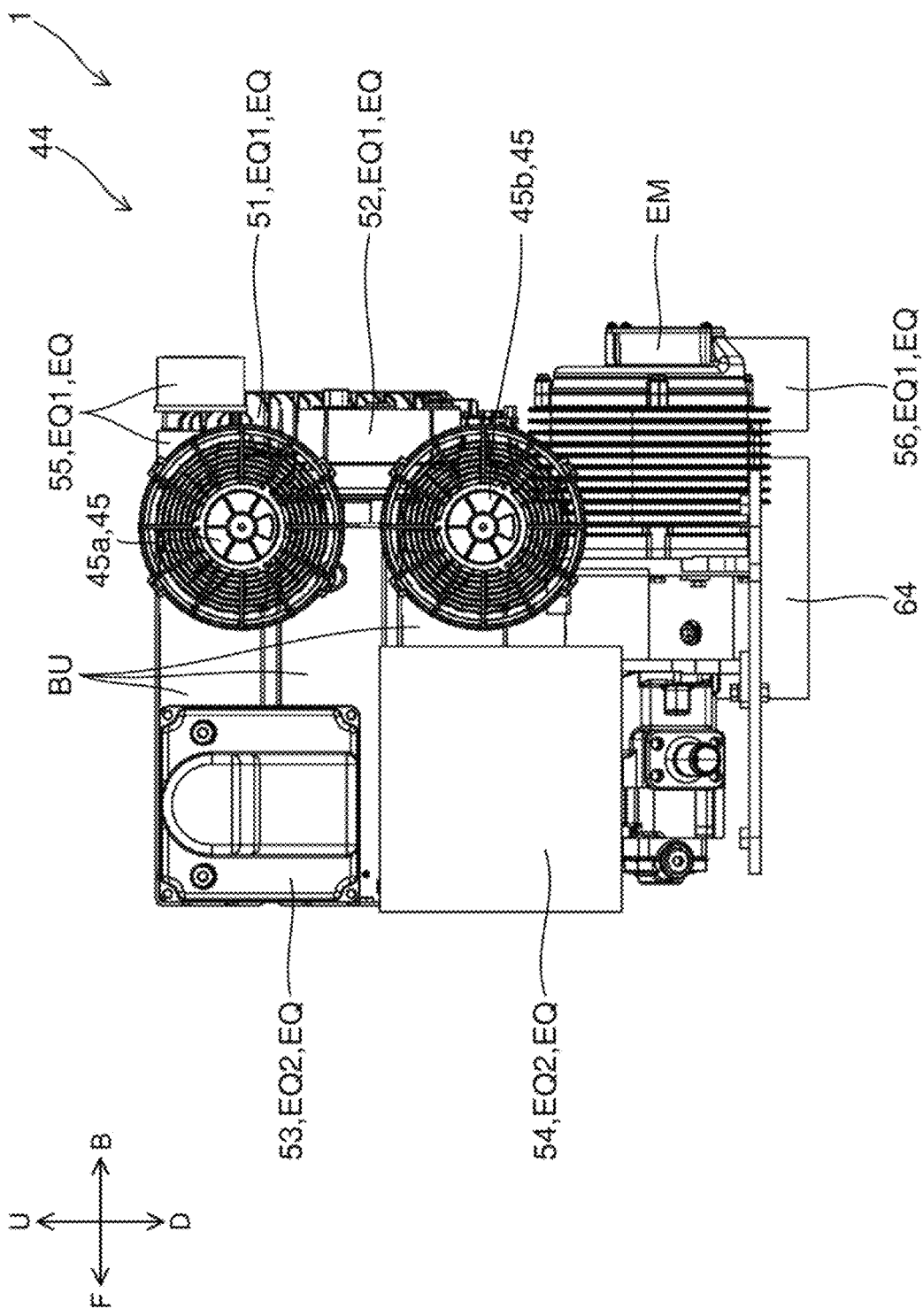
FIG. 6 is a left side view of the internal configuration in the first arrangement example of the engine room.

The arrangement of the devices (e.g., the fans 45, the oil cooler 46, the battery units BU, etc.) in the engine room 44 will be described with reference to FIGS. 4, 5, and 6. FIGS. 4, 5, and 6 are respectively a plan view, a back view, and a left side view of the internal configuration of the engine room 44. The devices placed in the engine room 44 are supported on the turning frame 41 via support members such as a stay; however, in FIGS. 4 to 6, the support members are not shown for the purpose of clarifying the arrangement positions of the devices. FIGS. 4 and 5 illustrate the left hood 44L cut in the horizontal direction and the up-down direction, respectively, at the positions of the first openings 44L1, for the purpose of clarifying the arrangement positions of the fans 45 with respect to the first openings 44L1. Similarly, FIGS. 4 and 5 illustrate the right hood 44R cut in the horizontal direction and the up-down direction, respectively, at the position of the second opening 44R1, for the purpose of clarifying the arrangement position of the oil cooler 46 with respect to the second opening 44R1.

As illustrated in FIGS. 4 and 5, the left hood 44L is located on the left side (first lateral side) of the engine room 44. The left hood 44L is provided with the first openings 44L1 that pass through the left hood 44L in the left-right direction. The left hood 44L is provided with two first openings 44L1 corresponding to the first fan 45a and the second fan 45b. The right hood 44R is located on the right side (second lateral side) of the engine room 44. The right hood 44R is provided with the second opening 44R1 and the third opening 44R2 that pass through the right hood 44R in the left-right direction. That is, the machine body (in particular, the engine room 44 of the upper turning body 4) has the first openings 44L1 provided on the first lateral side of the machine body and the second opening 44R1 provided on the second lateral side of the machine body.

The third opening 44R2 is located in front of the second opening 44R1. When the engine room 44 is viewed from the right, the third opening 44R2 is provided at a position overlapping with a front portion BU1 of the battery units BU. The front portion BU1 of the battery units BU refers to a portion of the battery units BU including a foremost surface of the battery units BU. Furthermore, the range of the front portion BU1 in the front-back direction is not particularly limited, and may be set as appropriate in the range in front of the center of the battery units BU in the front-back direction.

In the present embodiment, the third opening 44R2 is provided so that the entire third opening 44R2 overlaps with the front portion BU1 of the battery units BU; however, the configuration of the third opening 44R2 is not limited to this configuration. For example, the third opening 44R2 may be provided so that only a back portion of the third opening 44R2 overlaps with the front portion BU1. Thus, the machine body has the third opening 44R2 that is provided on the second lateral side and located in front of the second opening 44R1. Furthermore, at least part of the third opening 44R2 overlaps with the front portion BU1 of the battery units BU in side view.

The fans 45 (the first fan 45a and the second fan 45b) are placed at positions facing the first openings 44L1 on the inner side (i.e., the right side) of the engine room 44 with respect to the first openings 44L1. The oil cooler 46 is placed at a position facing the second opening 44R1 on the inner side (i.e., the left side) of the engine room 44 with respect to the second opening 44R1. That is, the fans 45 are placed to face the first openings 44L1 in the machine body, and the oil cooler 46 is placed to face the second opening 44R1 in the machine body.

When the engine room 44 is viewed from the back, the battery units BU are placed between the fans 45 and the second opening 44R1 (right hood 44R). That is, the battery units BU are placed between the fans 45 and the second opening 44R1 in back view. The hydraulic excavator 1 includes three battery units BU, and the battery units BU are arranged in the up-down direction.

The electric motor EM and the hydraulic oil tank 64 are arranged in the left-right direction below the battery units BU. The electric motor EM is provided on the left side (first lateral side) of the engine room 44, and the hydraulic oil tank 64 is provided on the right side (second lateral side) of the engine room 44.

The oil cooler 46 and part (first electrical equipment EQ1) of the electrical equipment EQ are placed behind the battery units BU. The first electrical equipment EQ1 includes the charger 51, the inverter 52, the DC-to-DC converters 55, and the lead battery 56. The inverter 52 and the DC-to-DC converters 55 are placed on the right side of the fans 45. The inverter 52 is located below the DC-to-DC converters 55. The charger 51 is placed on the right side of the inverter 52 and the DC-to-DC converters 55. The lead battery 56 is placed at a position that is below the charger 51 and is shifted to the left from the charger 51. The oil cooler 46 is located on the right side of the charger 51. Thus, the first electrical equipment EQ1 is placed between the fans 45 and the oil cooler 46 in the machine body.

As illustrated in FIGS. 4 and 6, the rest (second electrical equipment EQ2) of the electrical equipment EQ and the fans 45 are placed on the left side of the battery units BU. That is, the second electrical equipment EQ2 and the fans 45 are placed on a lateral side of the battery units BU. The second electrical equipment EQ2 includes the PDU 53 and the junction box 54. The second electrical equipment EQ2 is located in front of the fans 45. When the engine room 44 is viewed from the left, the fans 45 protrude backward from a back end portion of the battery units BU. That is, part of the fans 45 is located closer to the back side of the machine body than the battery units BU in side view.

According to the above configuration, when the fans 45 are driven, air is drawn (taken) into the machine body (in particular, the engine room 44 of the upper turning body 4) via the first openings 44L1. The air drawn into the machine body flows from the left side (first lateral side) toward the right side (second lateral side) in the machine body, and is discharged via the second opening 44R1. This leads to generation of a wind flow from the left side toward the right side in the machine body. The wind allows the devices (e.g., the oil cooler 46, the battery units BU, the electric motor EM, the electrical equipment EQ, etc.) placed in the machine body to be cooled. The air drawn into the machine body is also discharged via the third opening 44R2, and a wind flow toward the third opening 44R2 will be described below.

As described above, the oil cooler 46 is placed to face the second opening 44R1. Thus, the wind hits the oil cooler 46 last among the devices placed in the machine body. That is, the oil cooler 46 is cooled last among the devices in the machine body. Then, the wind at a relatively high temperature after cooling the oil cooler 46 (wind at a relatively high temperature) is directly discharged from the second opening 44R1 to the outside of the machine body. This makes it possible to discharge the wind at a relatively high temperature to the outside of the machine body while avoiding the wind at a relatively high temperature from hitting the battery units BU, the electric motor EM, and the electrical equipment EQ in the machine body. This enables the devices in the machine body to be efficiently cooled. Furthermore, the fans 45 are placed closer to the left side of the machine body, and the oil cooler 46 is placed closer to the right side of the machine body. This makes it possible to easily place the remaining devices in the machine body while securing a space for placing the battery units BU as large as possible in the left-right direction (width direction of the machine body) in the machine body. Thus, it is possible to provide the battery units BU as large as possible in the limited space in the machine body while efficiently cooling the devices in the machine body, achieving a higher battery capacity.

In the case where the battery units BU are placed between the fans 45 and the second opening 44R1, it is possible to easily increase the space for placing the battery units BU in the left-right direction, as compared with the case where the battery units BU are placed between the fans 45 and the oil cooler 46. That is, it is possible to easily increase the space for placing the battery units BU in the left-right direction by at least the width of the oil cooler 46 in the left-right direction. From this viewpoint, as in the present embodiment, the battery units BU are preferably placed between the fans 45 and the second opening 44R1 in back view.

By placing the first electrical equipment EQ1 (e.g., the charger 51) between the fans 45 and the oil cooler 46, it is possible to avoid the wind at a relatively high temperature after cooling the oil cooler 46 (wind at a relatively high temperature) from hitting the first electrical equipment EQ1. This enables the first electrical equipment EQ1 and the oil cooler 46 in the machine body to be efficiently cooled. Thus, as in the present embodiment, in a configuration in which the hydraulic excavator 1 includes the electrical equipment EQ connected to the battery units BU and the electrical equipment EQ includes the first electrical equipment EQ1 located closer to the back side of the machine body than the battery units BU in the machine body, the first electrical equipment EQ1 is preferably placed between the fans 45 and the oil cooler 46 in the machine body.

By arranging the electric motor EM and the hydraulic oil tank 64 below the battery units BU, it is possible to easily secure a space for placing the battery units BU in the horizontal direction. This makes it possible to easily provide the battery units BU large in the horizontal direction. Thus, as in the present embodiment, in a configuration in which the hydraulic excavator 1 further includes the hydraulic oil tank 64 in addition to the electric motor EM, the electric motor EM and the hydraulic oil tank 64 are preferably arranged below the battery units BU in the machine body.

The electric motor EM is provided on the same side of the machine body as the fans 45 (on the first lateral side of the machine body), and the hydraulic oil tank 64 is provided on the same side of the machine body as the oil cooler 46 (on the second lateral side of the machine body). In this case, below the battery units BU, the electric motor EM is placed on the upstream side of the wind flowing from the first openings 44L1 toward the second opening 44R1, and the hydraulic oil tank 64 is placed on the downstream side of the wind. In this arrangement, the wind after cooling the electric motor EM hits the hydraulic oil tank 64, allowing the hydraulic oil tank 64 to be cooled. Then, the wind after cooling the hydraulic oil tank 64 (wind at a relatively high temperature) is discharged from the second opening 44R1 to the outside of the machine body. That is, it is possible to avoid the wind at a relatively high temperature from hitting the electric motor EM. This enables the electric motor EM and the hydraulic oil tank 64 to be efficiently cooled. From this viewpoint, it is preferable to provide the electric motor EM on the first lateral side of the machine body and to provide the hydraulic oil tank 64 on the second lateral side of the machine body.

By arranging the plurality of fans 45 (the first fan 45a and the second fan 45b) in the up-down direction, it is possible to increase, in the up-down direction, the area in which a wind flows in the machine body. This allows a layout in which the pieces of electrical equipment EQ required to be cooled are arranged in the up-down direction in the machine body, achieving a higher degree of freedom in arrangement of the electrical equipment EQ. Furthermore, by placing the plurality of fans 45 in the up-down direction, it is possible to allow each of the fans 45 to have a smaller diameter as compared with a configuration in which a single fan is placed in the same area in the up-down direction. This enables the first openings 44L1 facing the fans 45 to have the minimum size, avoiding the machine body (particularly, the left hood 44L) from having a lower strength. From this viewpoint, as in the present embodiment, it is preferable to arrange the plurality of fans 45 in the up-down direction.

By placing the fans 45 on a lateral side (left side in the present embodiment) of the battery units BU, it is possible to allow the wind flowing from the fans 45 to efficiently hit the battery units BU. This enables the battery units BU to be efficiently cooled. From this viewpoint, as in the present embodiment, the fans 45 are preferably placed on a lateral side of the battery units BU.

When part of the wind flowing from the fans 45 flows behind the battery units BU, the first electrical equipment EQ1 placed behind the battery units BU is efficiently cooled. From this viewpoint, part of the fans 45 is preferably located closer to the back side of the machine body than the battery units BU in side view.

By placing the oil cooler 46 behind the battery units BU, it is possible to easily provide the battery units BU large in the left-right direction. Furthermore, the wind flowing from the fans 45 efficiently hits the oil cooler 46 behind the battery units BU. This enables the oil cooler 46 to be cooled at a higher cooling efficiency. From this viewpoint, as in the present embodiment, the oil cooler 46 is preferably placed closer to the back side of the machine body than the battery units BU.

The wind flow toward the third opening 44R2 will be described with reference to FIG. 4. Air drawn by the fans 45 from the first openings 44L1 into the interior of the engine room 44 passes through the interior of the engine room 44, and is discharged via the second opening 44R1 and also discharged via the third opening 44R2. As described above, the third opening 44R2 is located in front of the second opening 44R1. Thus, the air from the first openings 44L1 toward the third opening 44R2 flows along a side surface of the battery units BU (through a gap between the plurality of battery units BU in the up-down direction when the battery units BU are stacked) from the back side toward the front side while flowing from the left side toward the right side in the machine body. This leads to generation of a wind flow from the back side toward the front side and from the left side toward the right side in the machine body.

As described above, at least part of the third opening 44R2 overlaps with the front portion BU1 of the battery units BU in side view. In this case, a wind drawn into the machine body from the first openings 44L1 flows near the front portion BU1 of the battery units BU, and is discharged from the third opening 44R2. This makes it possible to allow the wind to hit the front portion BU1 of the battery units BU to cool the battery units BU. Thus, from the viewpoint of achieving a higher cooling efficiency of the battery units BU, as in the present embodiment, the hydraulic excavator 1 is preferably configured such that the machine body has the third opening 44R2 that is provided on the second lateral side and located in front of the second opening 44R1 and that at least part of the third opening 44R2 overlaps with the front portion BU1 of the battery units BU in side view.

By placing the second electrical equipment EQ2 (e.g., the PDU 53) at a position that is in front of the fans 45 and on a lateral side (left side in the present embodiment) of the battery units BU, it is possible to allow the wind flowing from the fans 45 toward the third opening 44R2 to efficiently hit the second electrical equipment EQ2 on the lateral side of the battery units BU. This enables the second electrical equipment EQ2 to be efficiently cooled. From the viewpoint of effectively utilizing the empty space on the lateral side of the battery units BU while efficiently cooling the second electrical equipment EQ2, as in the present embodiment, the hydraulic excavator 1 is preferably configured such that the electrical equipment EQ includes the second electrical equipment EQ2 located closer to the front side of the machine body than the fans 45 in the machine body and that the second electrical equipment EQ2 is placed at a position that is on the lateral side of the battery units BU and on the first lateral side of the machine body.

4. Another Internal Configuration of Engine Room

Figure 7:
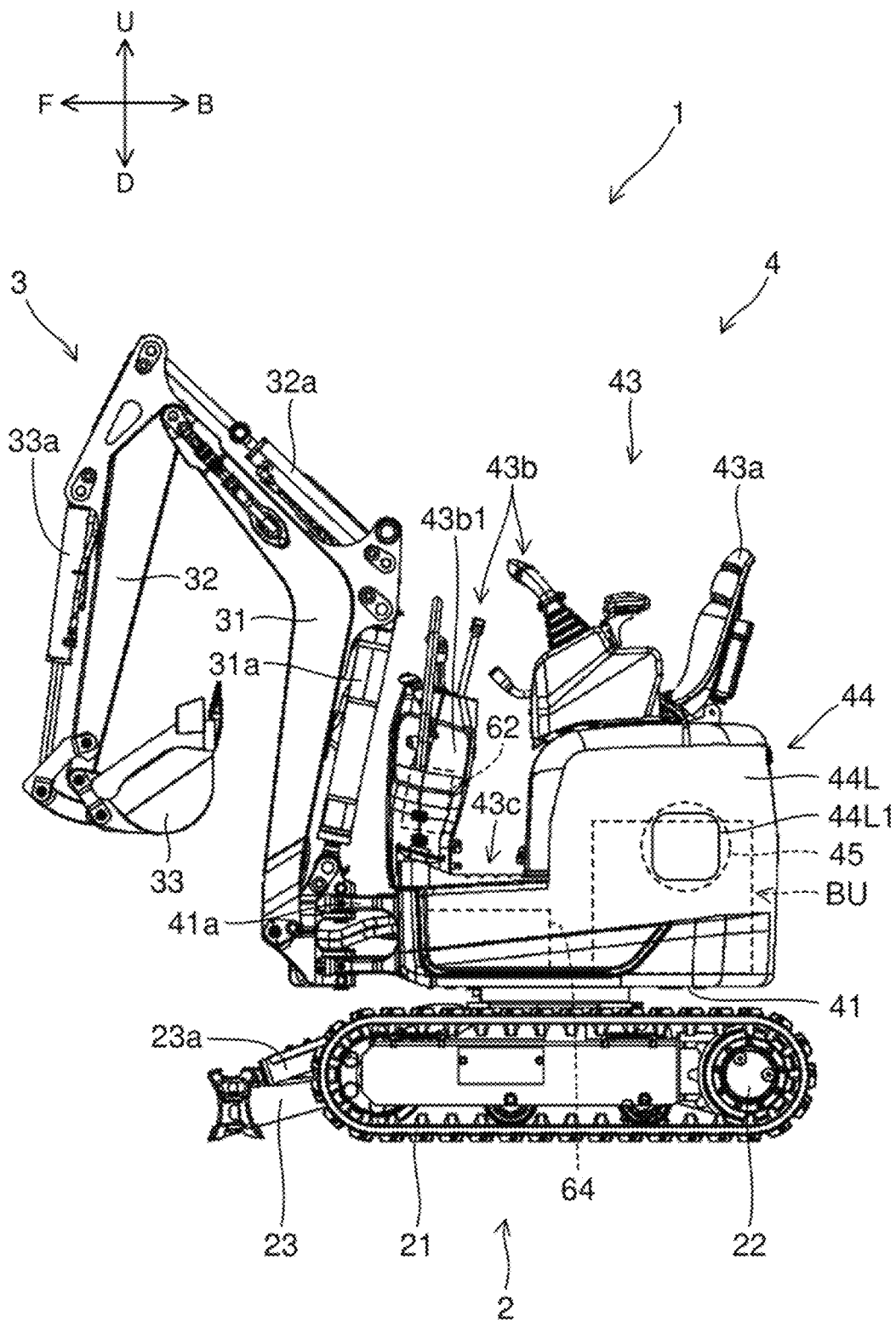
FIG. 7 is a left side view of the hydraulic excavator in which a second arrangement example is applied to the internal configuration of the engine room.
Figure 8:
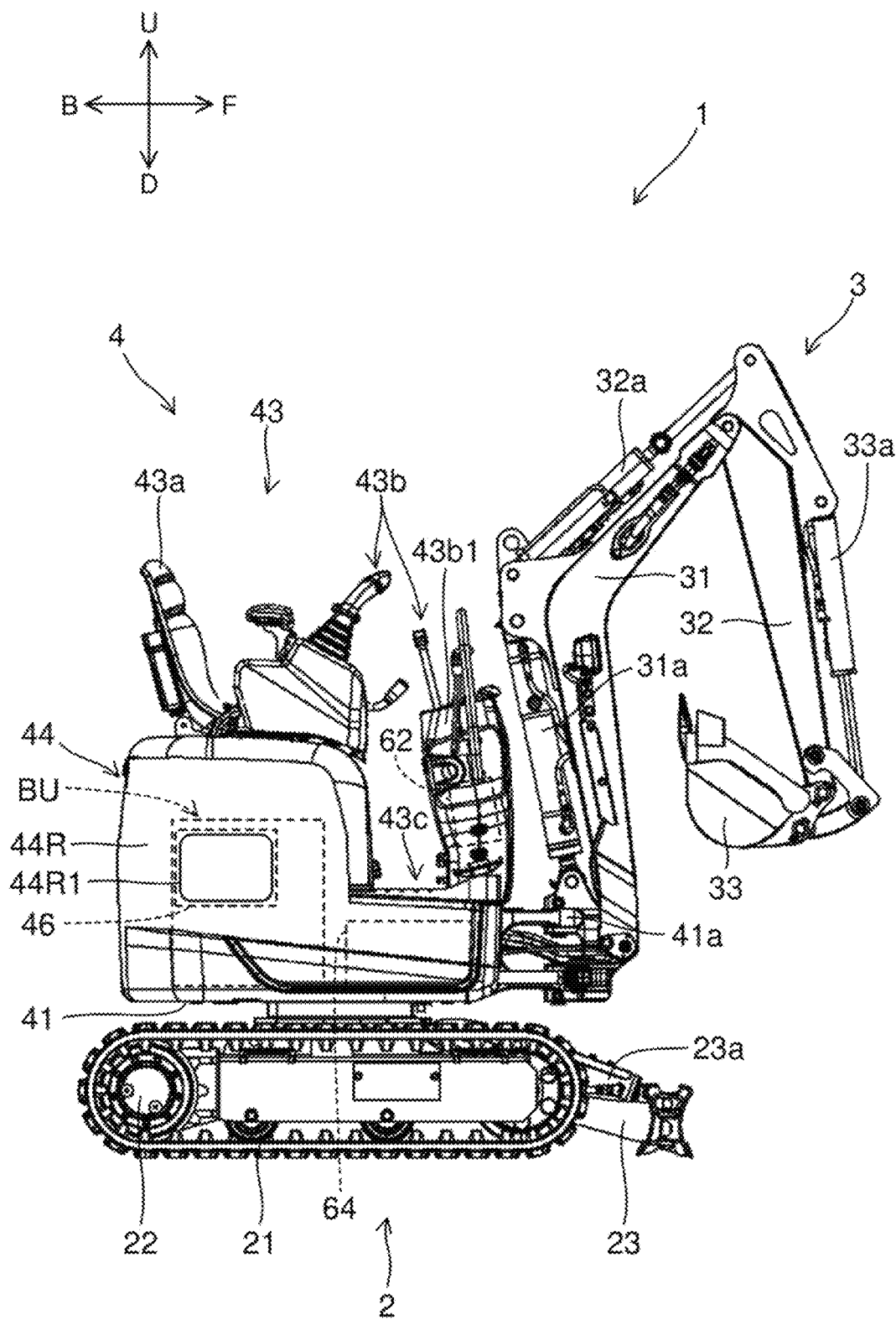
FIG. 8 is a right side view of the hydraulic excavator.
Figure 9:
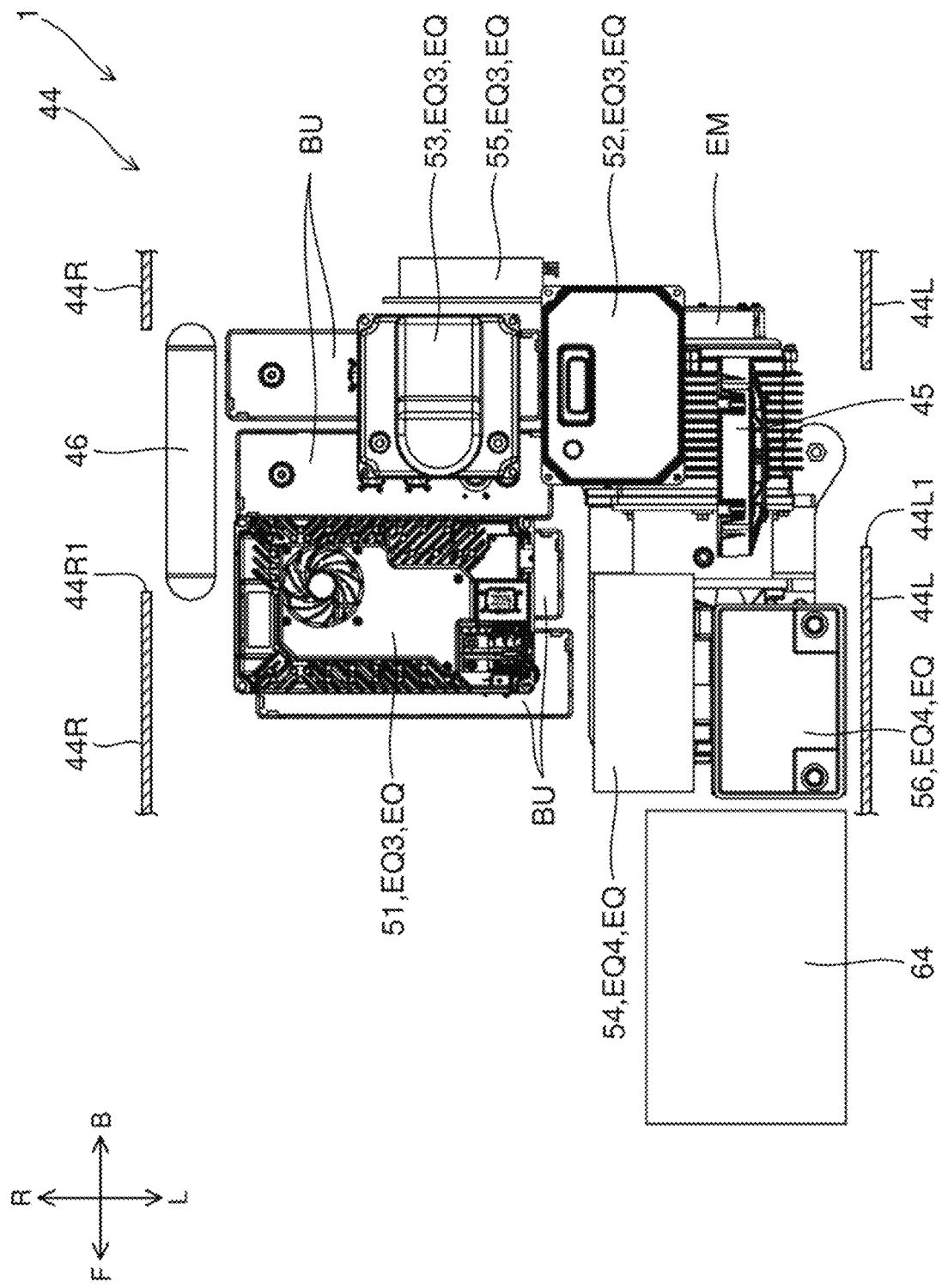
FIG. 9 is a plan view of the internal configuration in the second arrangement example of the engine room.
Figure 10:
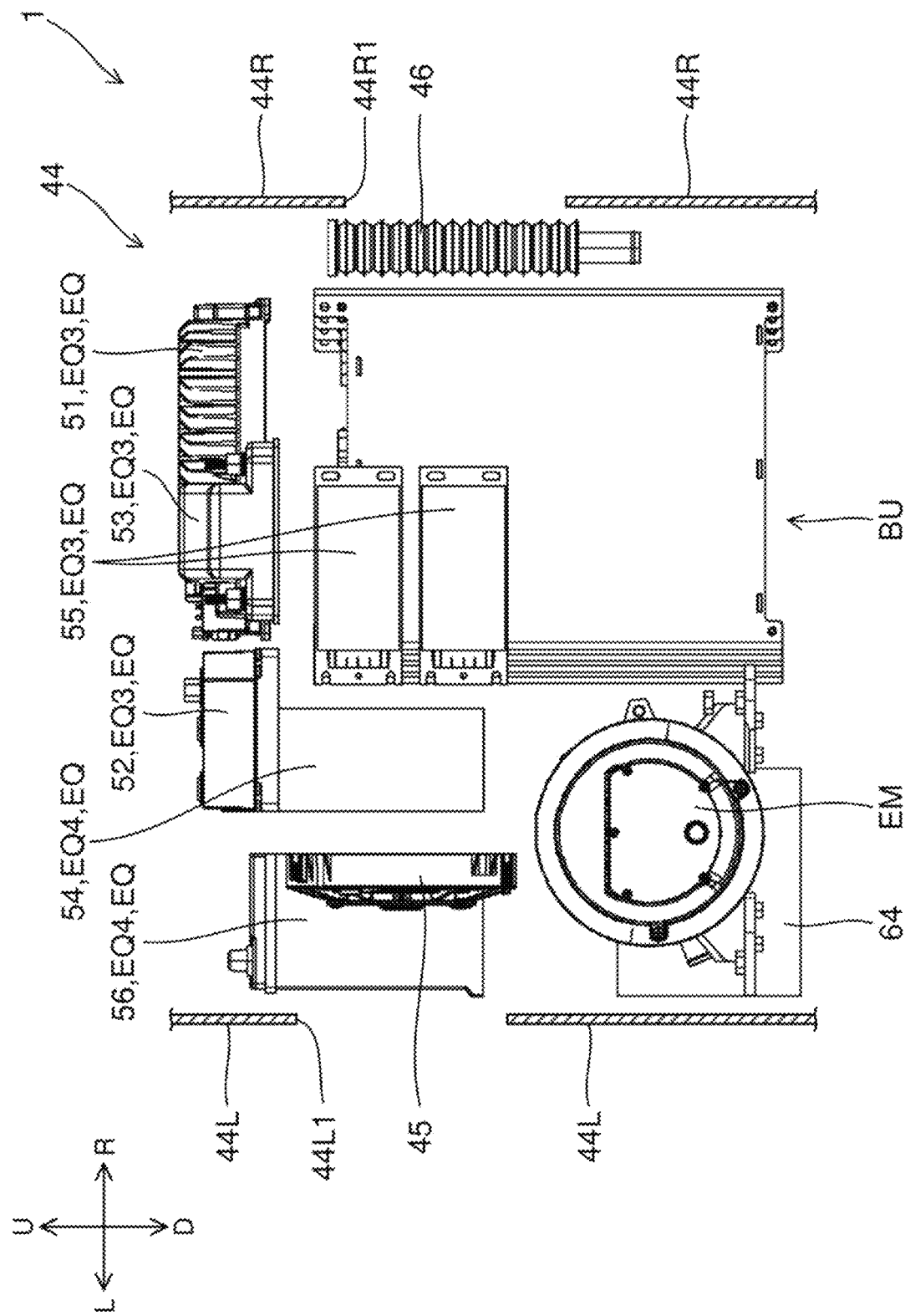
FIG. 10 is a back view of the internal configuration in the second arrangement example of the engine room.
Figure 11:
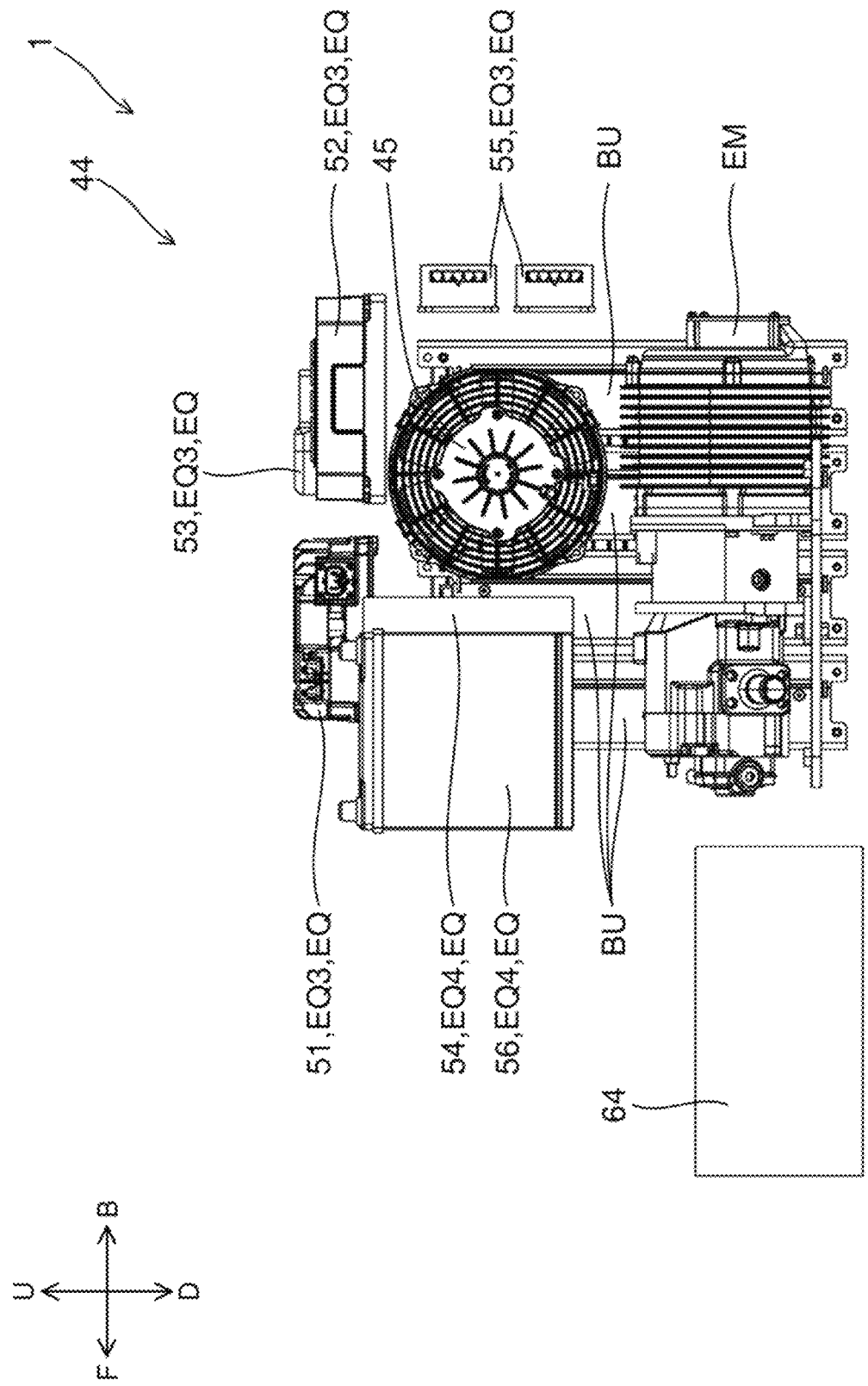
FIG. 11 is a left side view of the internal configuration in the second arrangement example of the engine room.

The following will describe a case in which the second arrangement example is applied to the internal configuration of the engine room 44. FIGS. 7 and 8 are respectively a left side view and a right side view of the hydraulic excavator 1 in this case. FIGS. 9, 10, and 11 are respectively a plan view, a back view, and a left side view of the internal configuration in the second arrangement example of the engine room 44. In FIGS. 9 to 11, as in FIGS. 4 to 6, the support members such as a stay are not shown for the purpose of clarifying the arrangement positions of the devices (e.g., a fan 45, the oil cooler 46, battery units BU, etc.). As with FIGS. 4 and 5, FIGS. 9 and 10 illustrate the left hood 44L cut in the horizontal direction and the up-down direction, respectively, at the position of a first opening 44L1, for the purpose of clarifying the arrangement position of the fan 45 with respect to the first opening 44L1. Similarly, FIGS. 9 and 10 illustrate the right hood 44R cut in the horizontal direction and the up-down direction, respectively, at the position of the second opening 44R1, for the purpose of clarifying the arrangement position of the oil cooler 46 with respect to the second opening 44R1.

As illustrated in FIGS. 7 to 11, the left hood 44L is provided with the first opening 44L1 that passes through the left hood 44L in the left-right direction. The fan 45 is placed at a position facing the first opening 44L1 in the engine room 44. Here, the hydraulic excavator 1 includes a single fan 45.

The right hood 44R is provided with the second opening 44R1 that passes through the right hood 44R in the left-right direction. The oil cooler 46 is placed at a position facing the second opening 44R1 in the engine room 44. The battery units BU and third electrical equipment EQ3 as part of the electrical equipment EQ are placed between the fan 45 and the oil cooler 46. The hydraulic excavator 1 includes four battery units BU, and the battery units BU are arranged in the front-back direction.

The third electrical equipment EQ3 includes the charger 51, the inverter 52, the PDU 53, and the DC-to-DC converters 55. The inverter 52 is placed on the right side of the fan 45. The PDU 53 is placed on the right side of the inverter 52. The charger 51 is placed in front of the PDU 53. The charger 51, the inverter 52, and the PDU 53 are located above the battery units BU. The DC-to-DC converters 55 are placed at a position that is behind the PDU 53 and on the back side of the battery units BU. The oil cooler 46 is located on the right side of the charger 51, the PDU 53, and the DC-to-DC converters 55. More specifically, the oil cooler 46 is located on the right side of the battery units BU.

The interior of the engine room 44 includes a space below a floor portion 43c provided at a position that is in front of the battery units BU and on the lower side of the manipulation unit 43. The hydraulic oil tank 64 is housed in the space. That is, the hydraulic oil tank 64 is placed closer to the front side of the machine body than the battery units BU in the machine body. Furthermore, as viewed from the back side of the machine body, the hydraulic oil tank 64 is located at a position that is shifted to the left from the battery units BU.

A support portion 43b1 of the steering members 43b that extends upward from the floor portion 43c is provided on the front side of the floor portion 43c. Some of the plurality of steering members 43b are provided on the support portion 43b1. The control valve 62 is housed in the support portion 43b1. Thus, the control valve 62 is located above the hydraulic oil tank 64.

The rest (fourth electrical equipment EQ4) of the electrical equipment EQ is placed at a position that is behind the hydraulic oil tank 64 and in front of the fan 45. The fourth electrical equipment EQ4 includes the junction box 54 and the lead battery 56. The junction box 54 and the lead battery 56 are arranged in the left-right direction on the left side of the battery units BU. The lead battery 56 is located on the left side of the junction box 54. The electric motor EM is placed at a position that is behind the hydraulic oil tank 64 and below the fan 45.

As described above, also in the second arrangement example, as in the first arrangement example, the machine body (in particular, the engine room 44 of the upper turning body 4) has the first opening 44L1 provided on the left side (first lateral side) of the machine body and the second opening 44R1 provided on the right side (second lateral side) of the machine body. Furthermore, the fan 45 is placed to face the first opening 44L1 in the machine body, and the oil cooler 46 is placed to face the second opening 44R1 in the machine body. Thus, also in the second arrangement example, the same effect as in the first arrangement example can be obtained. More specifically, it is possible to secure a space for placing the battery units BU as large as possible while efficiently cooling the devices (e.g., the oil cooler 46, the battery units BU, the electric motor EM, the electrical equipment EQ, etc.) in the machine body.

By placing the battery units BU between the fan 45 and the oil cooler 46, it is possible to avoid the wind at a relatively high temperature after cooling the oil cooler 46 from hitting the battery units BU. This enables the battery units BU and the oil cooler 46 in the machine body to be efficiently cooled. Thus, as in the second arrangement example, the battery units BU may be placed between the fan 45 and the oil cooler 46.

By placing the third electrical equipment EQ3 (e.g., the charger 51) between the fan 45 and the oil cooler 46, it is possible to avoid the wind at a relatively high temperature after cooling the oil cooler 46 from hitting the third electrical equipment EQ3. This enables the third electrical equipment EQ3 and the oil cooler 46 in the machine body to be efficiently cooled. Thus, in a configuration in which the hydraulic excavator 1 includes the electrical equipment EQ, as in the second arrangement example, the part (third electrical equipment EQ3) of the electrical equipment EQ may be placed between the fan 45 and the oil cooler 46 in the machine body.

By placing the hydraulic oil tank 64 in front of the battery units BU, it is possible to easily secure a space for placing the battery units BU in the up-down direction as compared with the first arrangement example in which the hydraulic oil tank 64 is placed below the battery units BU. This makes it possible to easily provide the battery units BU large in the up-down direction. Furthermore, the empty space in front of the battery units BU in the machine body is effectively utilized as a space for placing the hydraulic oil tank 64. From this viewpoint, in a configuration in which the hydraulic excavator 1 includes the hydraulic oil tank 64, as in the second arrangement example, the hydraulic oil tank 64 may be placed closer to the front side of the machine body than the battery units BU in the machine body.

In such a case, when the hydraulic oil tank 64 is placed at a position that is shifted to either the left or right from the battery units BU, the space for placing the battery units BU can be extended forward to allow the battery units BU to have a higher capacity. Furthermore, instead of extending forward the space for placing the battery units BU, another member can be placed in the space in front of the battery units BU. For example, a swing cylinder (not illustrated) that causes the boom 31 (see FIGS. 7 and 8) to swing can be placed in the space in front of the battery units BU. Thus, in order to allow the battery units BU to have a higher capacity or to effectively utilize the space in front of the battery units BU as a space for placing another member, as in the second arrangement example, the hydraulic oil tank 64 is preferably placed at a position that is shifted to either the left or right (left in the second arrangement example) from the battery units BU.

From the viewpoint of effectively utilizing the empty space located at a position that is behind the hydraulic oil tank 64 and below the fan 45 in the machine body, as in the second arrangement example, the electric motor EM is preferably placed at a position that is closer to the back side of the machine body than the hydraulic oil tank 64 and is below the fan 45.

From the viewpoint of effectively utilizing the empty space located at a position that is behind the hydraulic oil tank 64 and in front of the fan 45 in the machine body, as in the second arrangement example, the fourth electrical equipment EQ4 (e.g., the junction box 54) is preferably placed at a position that is closer to the back side of the machine body than the hydraulic oil tank 64 and is closer to the front side of the machine body than the fan 45.

When the control valve 62 is placed above the hydraulic oil tank 64, even if hydraulic oil is leaked from the control valve 62, it is possible to avoid the leaked hydraulic oil from being attached to the battery units BU. Furthermore, as illustrated in FIGS. 7 and 8, a configuration in which the support portion 43*b*1 is located above the hydraulic oil tank 64 via the floor portion 43*c* allows a layout in which the control valve 62 is placed in the support portion 43*b*1. In this case, it is easy to effectively utilize the space in the support portion 43*b*1 to achieve an ultra-small turning type small-sized hydraulic excavator 1. Thus, in a configuration in which the hydraulic excavator 1 includes the control valve 62 in addition to the hydraulic oil tank 64, as in the second arrangement example, the control valve 62 may be placed above the hydraulic oil tank 64.

5. Supplement

In the configuration of the present embodiment, the hydraulic excavator 1 includes three battery units BU (first arrangement example) or four battery units BU (second arrangement example). However, the configuration of the battery units BU is not limited to this. The battery units BU may be as large as possible according to the space secured for placing the battery units BU.

In the configuration of the present embodiment, the hydraulic excavator 1 includes two fans 45 (first arrangement example) or a single fan 45 (second arrangement example); however, the configuration of the fans 45 is not limited to this. The hydraulic excavator 1 may be configured to secure a wind (air volume) required to cool the devices (e.g., the oil cooler 46, the battery units BU, etc.) in the engine room 44, and the size and number of fans 45 may be selected according to the required air volume.

FIG. 1 illustrates the first openings 44L1 smaller than the outer diameter of the fans 45 (the first fan 45*a* and the second fan 45*b*), and FIG. 7 illustrates the first opening 44L1 smaller than the outer diameter of the fan 45; however, one or more first openings 44L1 may be larger than the outer diameter of one or more fans 45. Similarly, FIGS. 2 and 8 illustrate the second opening 44R1 smaller than the outer diameter of the oil cooler 46; however, the second opening 44R1 may be larger than the outer diameter of the oil cooler 46. Furthermore, a protective member (e.g., a louver, mesh, etc.) may be attached to one or more first openings 44L1, the second opening 44R1, and the third opening 44R2. When the protective member is attached to the openings, part of the openings is closed by the protective member; thus, the size of the openings is preferably selected considering the protective member.

In the configuration of the present embodiment, the machine body (right hood 44R) has the third opening 44R2; however, the machine body may not necessarily have the third opening 44R2. Even when the machine body has no third opening 44R2, air drawn from one or more first openings 44L1 into the machine body is discharged from the second opening 44R1 to the outside of the machine body. This still allows a wind to flow from the left side toward the right side in the machine body. Furthermore, the wind still allows the devices (e.g., the oil cooler 46, the battery units BU, etc.) in the machine body to be cooled. That is, in such a case as well, it is possible to obtain the effect of providing the battery units BU as large as possible in the limited space in the machine body while efficiently cooling the devices in the machine body.

In the present embodiment, the one or two first openings 44L1, the second opening 44R1, and the third opening 44R2 are provided in the engine room 44 and the one or two fans 45 are provided at positions facing the one or two first openings 44L1 in the engine room 44 so that a wind flows from the left side toward the right side in the interior of the engine room 44; however, the arrangement is not limited to this. For example, openings and one or more fans 45 may be placed so that a wind flows from the right side toward the left side in the interior of the engine room 44. In such a case, the positions of the devices (members) in the engine room 44 are reversed in the left-right direction from the positions in the present embodiment.

In the present embodiment, the hydraulic excavator 1 that is a construction machine has been described as an example of an electric work machine; however, the electric work machine is not limited to the hydraulic excavator 1, and may be a construction machine such as a wheel loader. The electric work machine may be an agricultural machine such as a combine harvester or a tractor.

6. Appendices

The hydraulic excavator 1 described in the present embodiment can also be expressed as an electric work machine as described in the following appendices.

An electric work machine of appendix (1) includes: in a machine body,
a battery unit that stores electric power;
an electric motor that is driven by the electric power supplied from the battery unit;
a hydraulic pump that is driven by the electric motor;
an oil cooler that cools hydraulic oil discharged from the hydraulic pump; and
a fan that draws air into the machine body, wherein
the machine body has a first opening and a second opening,
the first opening is provided on a first lateral side of the machine body,
the second opening is provided on a second lateral side of the machine body,
the fan is placed to face the first opening in the machine body, and
the oil cooler is placed to face the second opening in the machine body.

An electric work machine of appendix (2) is the electric work machine according to appendix (1), wherein
the battery unit is placed between the fan and the second opening in back view.

An electric work machine of appendix (3) is the electric work machine according to appendix (2), including
electrical equipment that is connected to the battery unit, wherein
the electrical equipment includes first electrical equipment that is located closer to a back side of the machine body than the battery unit in the machine body, and
the first electrical equipment is placed between the fan and the oil cooler in the machine body.

An electric work machine of appendix (4) is the electric work machine according to appendix (3), including
a hydraulic oil tank that stores the hydraulic oil, wherein
the electric motor and the hydraulic oil tank are arranged below the battery unit in the machine body,
the electric motor is provided on the first lateral side of the machine body, and
the hydraulic oil tank is provided on the second lateral side of the machine body.

An electric work machine of appendix (5) is the electric work machine according to appendix (3) or (4), wherein
the fan is placed on a lateral side of the battery unit.

An electric work machine of appendix (6) is the electric work machine according to appendix (5), wherein part of the fan is located closer to the back side of the machine body than the battery unit in side view.

An electric work machine of appendix (7) is the electric work machine according to any one of appendices (3) to (6), wherein the oil cooler is placed closer to the back side of the machine body than the battery unit.

An electric work machine of appendix (8) is the electric work machine according to any one of appendices (3) to (7), wherein the machine body has a third opening that is provided on the second lateral side and located in front of the second opening, and at least part of the third opening overlaps with a front portion of the battery unit in side view.

An electric work machine of appendix (9) is the electric work machine according to appendix (8), wherein the electrical equipment includes second electrical equipment that is located closer to a front side of the machine body than the fan in the machine body, and the second electrical equipment is placed at a position that is on a lateral side of the battery unit and on the first lateral side of the machine body.

An electric work machine of appendix (10) is the electric work machine according to any one of appendices (1) to (9), wherein a plurality of the fans are arranged in an up-down direction.

An electric work machine of appendix (11) is the electric work machine according to appendix (1), wherein the battery unit is placed between the fan and the oil cooler.

An electric work machine of appendix (12) is the electric work machine according to appendix (11), including electrical equipment that is connected to the battery unit, wherein the electrical equipment includes third electrical equipment that is located between the fan and the oil cooler in the machine body.

An electric work machine of appendix (13) is the electric work machine according to appendix (12), including a hydraulic oil tank that stores the hydraulic oil, wherein the hydraulic oil tank is placed closer to a front side of the machine body than the battery unit in the machine body.

An electric work machine of appendix (14) is the electric work machine according to appendix (13), wherein the hydraulic oil tank is placed at a position that is either shifted to the left or shifted to the right relative to the battery unit.

An electric work machine of appendix (15) is the electric work machine according to appendix (13) or (14), wherein the electric motor is placed at a position that is closer to a back side of the machine body than the hydraulic oil tank and is below the fan.

An electric work machine of appendix (16) is the electric work machine according to any one of appendices (13) to (15), wherein the electrical equipment includes fourth electrical equipment that is placed in the machine body, and the fourth electrical equipment is located at a position that is closer to a back side of the machine body than the hydraulic oil tank and is closer to the front side of the machine body than the fan.

An electric work machine of appendix (17) is the electric work machine according to any one of appendices (13) to (16), further including:

a hydraulic actuator that is driven by the hydraulic oil; and a control valve that controls a flow direction and a flow rate of the hydraulic oil supplied from the hydraulic pump to the hydraulic actuator, wherein the control valve is placed above the hydraulic oil tank.

The embodiment of the present invention has been described above; however, the scope of the present invention is not limited thereto, and may be expanded or modified without departing from the gist of the invention.

INDUSTRIAL APPLICABILITY

The present invention is applicable, for example, to an electric work machine such as a construction machine or an agricultural machine.

REFERENCE SIGNS LIST

1 Hydraulic excavator (electric work machine)
4 Upper turning body (machine body)
44L1 First opening
44R1 Second opening
44R2 Third opening
45 Fan
46 Oil cooler
61 Hydraulic pump
62 Control valve
63 Hydraulic actuator
64 Hydraulic oil tank
BU Battery unit
BU1 Front portion
EM Electric motor
EQ Electrical equipment
EQ1 First electrical equipment
EQ2 Second electrical equipment
EQ3 Third electrical equipment
EQ4 Fourth electrical equipment

The invention claimed is:

1. An electric work machine comprising: in a machine body, a battery unit that stores electric power;
an electric motor that is driven by the electric power supplied from the battery unit;
a hydraulic pump that is driven by the electric motor;
an oil cooler that cools hydraulic oil discharged from the hydraulic pump; and
a fan that draws air into the machine body, wherein
the machine body has a first opening and a second opening,
the first opening is provided on a first lateral side of the machine body,
the second opening is provided on a second lateral side of the machine body,
the fan is placed to face the first opening in the machine body,
the oil cooler is placed to face the second opening in the machine body, and wherein the battery unit is placed between the fan and the oil cooler.

2. The electric work machine according to claim 1, wherein the battery unit is placed between the fan and the second opening in back view.

3. The electric work machine according to claim 2, comprising electrical equipment that is connected to the battery unit, wherein the electrical equipment includes first electrical equipment that is located closer to a back side of the machine body than the battery unit in the machine body, and the first electrical equipment is placed between the fan and the oil cooler in the machine body.

4. The electric work machine according to claim 3, comprising a hydraulic oil tank that stores the hydraulic oil, wherein the electric motor and the hydraulic oil tank are arranged below the battery unit in the machine body, the electric motor is provided on the first lateral side of the machine body, and the hydraulic oil tank is provided on the second lateral side of the machine body.

5. The electric work machine according to claim 3, wherein the fan is placed on a lateral side of the battery unit.

6. The electric work machine according to claim 5, wherein part of the fan is located closer to the back side of the machine body than the battery unit in side view.

7. The electric work machine according to claim 3, wherein the oil cooler is placed closer to the back side of the machine body than the battery unit.

8. The electric work machine according to claim 3, wherein the machine body has a third opening that is provided on the second lateral side and located in front of the second opening, and at least part of the third opening overlaps with a front portion of the battery unit in side view.

9. The electric work machine according to claim 8, wherein the electrical equipment includes second electrical equipment that is located closer to a front side of the machine body than the fan in the machine body, and the second electrical equipment is placed at a position that is on a lateral side of the battery unit and on the first lateral side of the machine body.

10. The electric work machine according to claim 1, wherein a plurality of the fans are arranged in an up-down direction.

11. The electric work machine according to claim 1, comprising electrical equipment that is connected to the battery unit, wherein the electrical equipment includes third electrical equipment that is located between the fan and the oil cooler in the machine body.

12. The electric work machine according to claim 11, comprising a hydraulic oil tank that stores the hydraulic oil, wherein the hydraulic oil tank is placed closer to a front side of the machine body than the battery unit in the machine body.

13. The electric work machine according to claim 12, wherein the hydraulic oil tank is placed at a position that is either shifted left or shifted right relative to the battery unit.

14. The electric work machine according to claim 12, wherein the electric motor is placed at a position that is closer to a back side of the machine body than the hydraulic oil tank and is below the fan.

15. The electric work machine according to claim 12, wherein the electrical equipment includes fourth electrical equipment that is placed in the machine body, and the fourth electrical equipment is located at a position that is closer to a back side of the machine body than the hydraulic oil tank and is closer to the front side of the machine body than the fan.

16. The electric work machine according to claim 12, further comprising:

a hydraulic actuator that is driven by the hydraulic oil; and a control valve that controls a flow direction and a flow rate of the hydraulic oil supplied from the hydraulic pump to the hydraulic actuator, wherein the control valve is placed above the hydraulic oil tank.

* * * * *